S. B. HUNT.
Apparatus for Separating from Compressed Air the Water of Condensation.
No. 223,648. Patented Jan. 20, 1880.
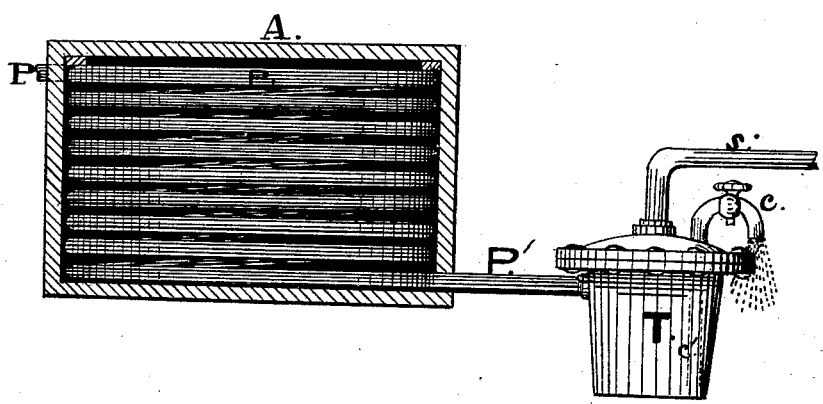

United States Patent Office.

SIMON B. HUNT, OF NEW YORK, N. Y.

APPARATUS FOR SEPARATING FROM COMPRESSED AIR THE WATER OF CONDENSATION.

SPECIFICATION forming part of Letters Patent No. 223,648, dated January 20, 1880.

Application filed May 23, 1879.

*To all whom it may concern:*

Be it known that I, SIMON BENTON HUNT, of the city of New York, in the county of New York and State of New York, have invented certain new and useful Improvements in Apparatus for Producing Dry Atmospheric Air for Refrigerating; and I do hereby declare that the following is a full, clear, and exact description of the invention, which will enable others skilled in the art to which it appertains to make and use the same, reference being had to the accompanying drawing, and to letters of reference marked thereon, which forms a part of this specification.

This invention relates to an improved apparatus to prevent the freezing of the valves, pipes, &c., of either an ice-making or refrigerating apparatus by the accumulation of condensed water produced by the compression of atmospheric air.

My invention consists in the construction of an air-trap, T, arranged independently of the other apparatus, to receive the water of condensation produced by compressing the air. From thence it (the air) passes into the expanding-engine, and from there to the refrigerating or freezing room.

Referring to the drawing, A is a water-tank containing a coil of piping, P, charged or filled with compressed air, which is discharged into an air-trap, T, through pipe P', where the water of condensation is precipitated by its own gravity to the bottom thereof, from whence it is forced out through the blow-off pipe c by the expanding force of the air under pressure in the said trap. This pipe c passes downward (inside of the trap) to within a short distance from the bottom, as shown in dotted lines at c'. Pipe s conveys the dry air under pressure from the trap to the cylinder of the expanding-engine.

My invention is confined to the means for producing dry compressed atmospheric air for refrigerating purposes, &c., and preventing the freezing of the pipes, valves, &c., by drawing off the condensed water produced in the several parts of the apparatus during the process of compressing the gaseous fluid by means of the trap T and blow-off pipe c, suitably arranged and operating for the purpose set forth.

I claim—

The air-trap T, having the pipes P' and s, arranged at the top of the trap, in combination with the blow-off cock and pipe c c', extending into and near the bottom of said trap, for the purpose set forth.

In testimony that I claim the foregoing as my own invention I affix my signature in presence of two witnesses.

SIMON BENTON HUNT.

Witnesses:
 R. A. MORRISON,
 JAMES P. MCLEAN.